(12) United States Patent
Schurle et al.

(10) Patent No.: US 9,297,468 B2
(45) Date of Patent: Mar. 29, 2016

(54) SANITARY OUTLET UNIT

(75) Inventors: Holger Schurle, Neuenberg (DE);
Werner Bammerlin, Mullheim (DE);
Michael Steinbrunner,
Buggingen/Seefelden (DE)

(73) Assignee: Neoperl GmbH, Müllheim (DE)

(*) Notice: Subject to any disclaimer, the term of this patent is extended or adjusted under 35 U.S.C. 154(b) by 320 days.

(21) Appl. No.: 13/518,642

(22) PCT Filed: Nov. 19, 2010

(86) PCT No.: PCT/EP2010/007039
§ 371 (c)(1),
(2), (4) Date: Jun. 22, 2012

(87) PCT Pub. No.: WO2011/076320
PCT Pub. Date: Jun. 30, 2011

(65) Prior Publication Data
US 2012/0256016 A1    Oct. 11, 2012

(30) Foreign Application Priority Data

Dec. 23, 2009  (DE) .......................... 10 2009 060 501

(51) Int. Cl.
*E03C 1/08* (2006.01)
*F16K 24/02* (2006.01)
*F16K 11/078* (2006.01)

(52) U.S. Cl.
CPC .............. *F16K 24/02* (2013.01); *F16K 11/0787* (2013.01)

(58) Field of Classification Search
CPC ............... B05B 7/0425; A61H 33/027; A61H 2033/022; E03C 1/084; F23D 11/104

USPC ............................................... 239/428.5, 435
See application file for complete search history.

(56) References Cited

U.S. PATENT DOCUMENTS

| 2,962,226 | A | * | 11/1960 | Goodrie | ...................... 239/428.5 |
| 4,335,854 | A | * | 6/1982 | Reynoso | ...................... 239/428.5 |
| 4,629,124 | A | * | 12/1986 | Gruber | ........................ 239/428.5 |
| 2007/0199599 | A1 | | 8/2007 | Creswell et al. | |
| 2007/0252022 | A1 | | 11/2007 | Benstead | |
| 2008/0067264 | A1 | * | 3/2008 | Erickson et al. | ............... 239/445 |
| 2008/0272212 | A1 | * | 11/2008 | Denzler | ..................... 239/428.5 |

FOREIGN PATENT DOCUMENTS

| DE | 1220345 | 6/1966 |
| DE | 30000799 | 7/1981 |
| DE | 102006021801 | 11/2007 |
| DE | 102007058835 | 6/2009 |

* cited by examiner

*Primary Examiner* — Len Tran
*Assistant Examiner* — Adam J Rodgers
(74) *Attorney, Agent, or Firm* — Volpe and Koenig, P.C.

(57) ABSTRACT

A sanitary outlet unit having an outlet fitting having at least one water outlet and including an aeration device for aerating the water flow and arranged in the flow direction spaced from and upstream of the at least one water outlet, and having at least one valve part, which regulates the inflow from at least one water pipe to the water outlet (3). To provide a sanitary outlet unit that ensures reliable aeration of the water flow that can be integrated without undue structural modifications into existing fittings, the aeration device is received in the at least one valve part and the aeration device is provided with at least one actuator, the movement of which between at least one closed and at least one open position alters the admission of ambient air to the water flow inside the valve part.

19 Claims, 4 Drawing Sheets

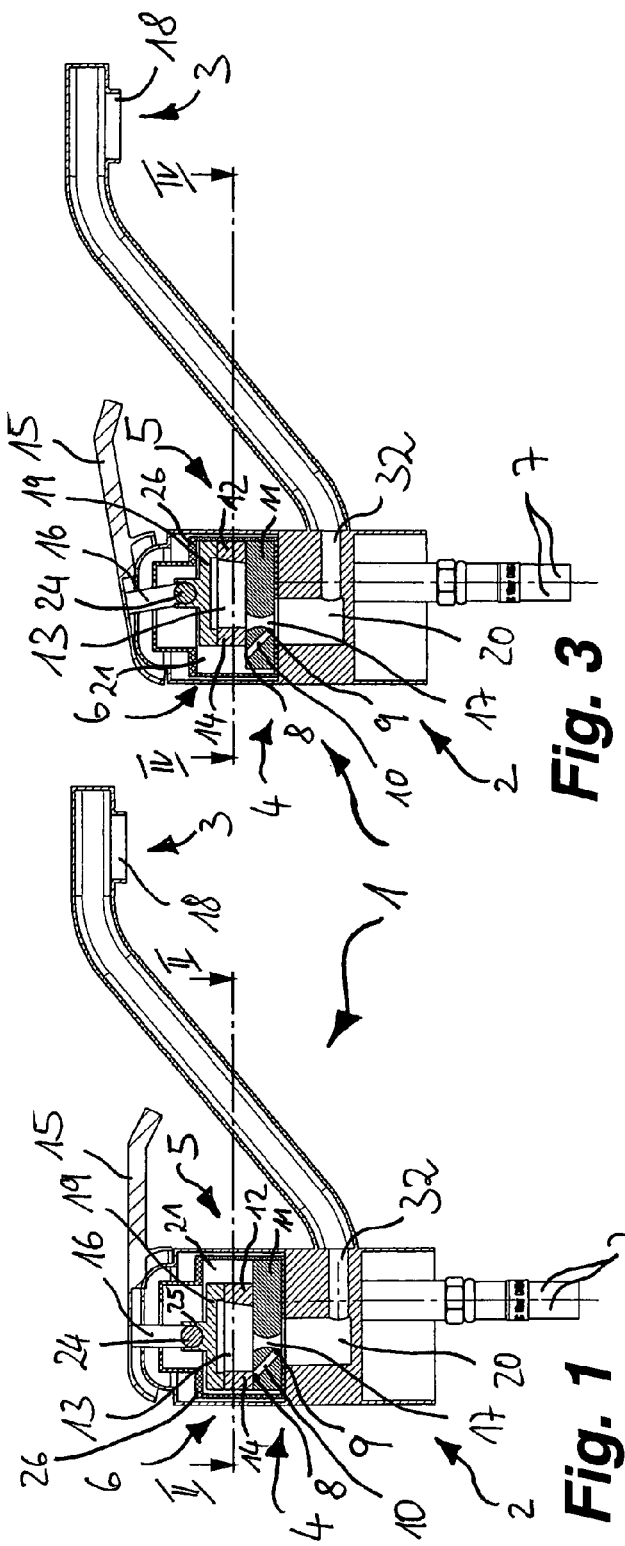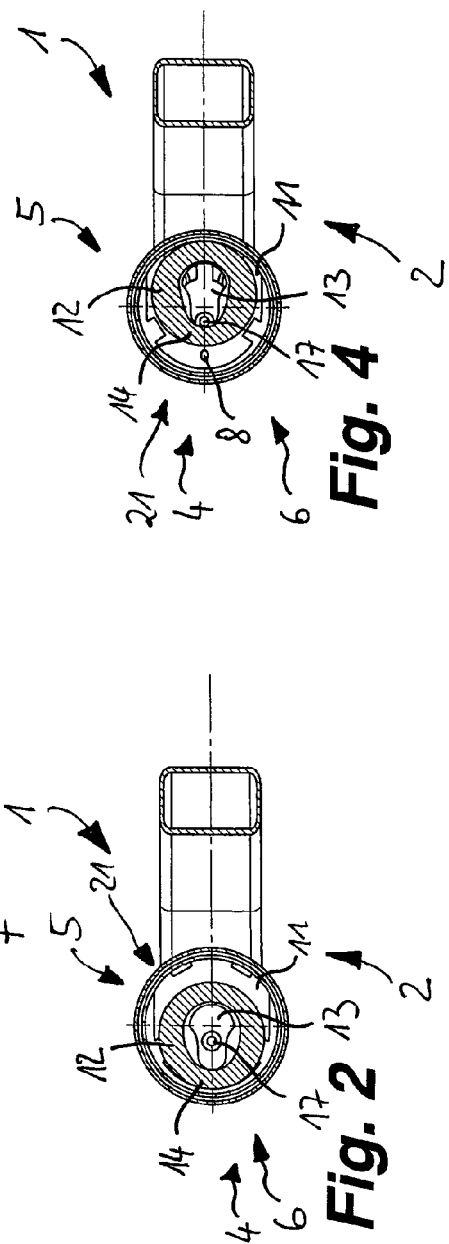

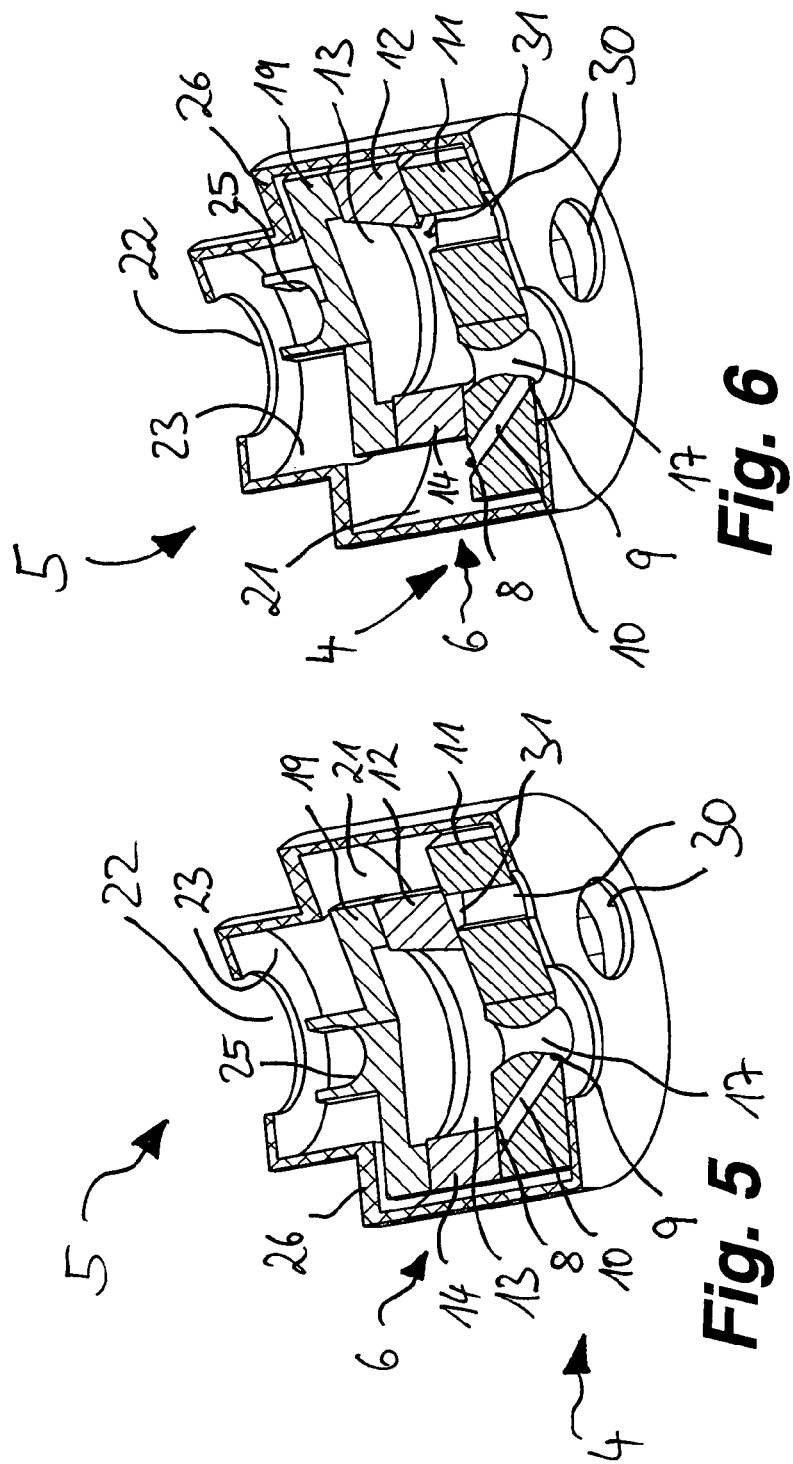

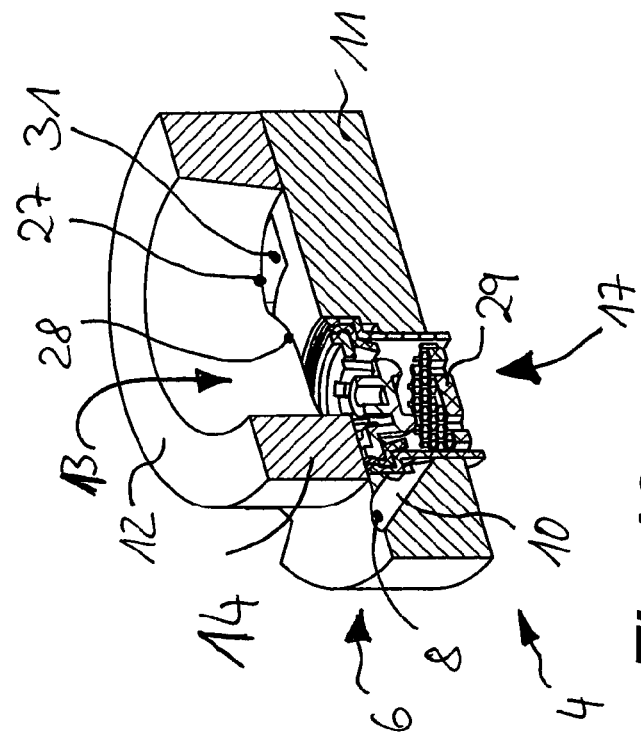
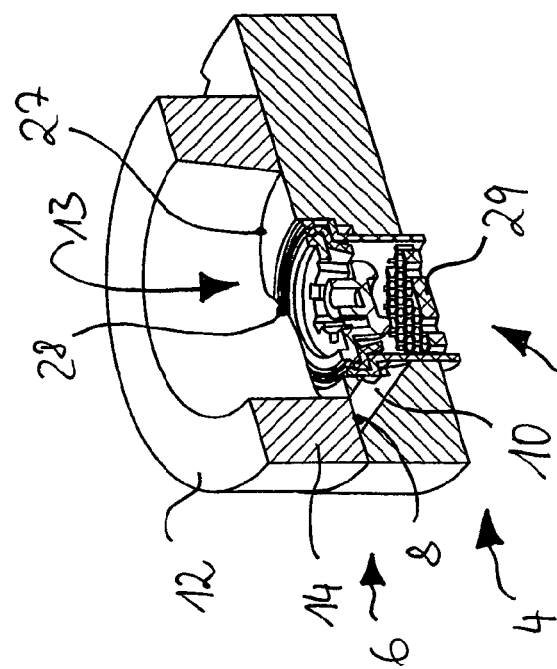

SANITARY OUTLET UNIT

BACKGROUND

The invention relates to a sanitary outlet unit comprising an outlet fitting which has at least one water outlet and comprising at least one aeration device which is provided for aerating the water jet and is arranged upstream of the at least one water outlet at a distance therefrom in the direction of flow, and comprising at least one valve part which regulates the inflow from at least one water line to the water outlet.

Outlet units are already known in which a jet regulator is arranged in the region of the water outlet and is intended to aerate the water jet emerging from the water outlet and to form it into a homogeneous sparkling, soft water jet. To this end, the jet regulator housing of the previously known jet regulators is provided with a jet splitter, which is usually configured as a perforated plate and downstream of which there are provided a homogenizing device and, if appropriate, a flow straightener. The jet regulator housing of the previously known jet regulators has aeration openings in the region of the homogenizing device which serve as an aeration device for aerating the water jet which has momentarily been split into individual jets by means of the jet splitter (cf. DE-A-30 00 799). The previously known jet regulators are inserted with the jet regulator housing thereof into an outlet mouthpiece, which can be fastened releasably to the fitting outlet by means of a screw connection.

The outlet mouthpiece required for mounting the previously known jet regulators determines the form of sanitary outlet fittings in the region of the fitting outlet. There is an increasing desire, however, to design unconventional and esthetically demanding outlet fittings.

DE 1 220 345 A discloses an extendible swivel arm. Such extending swivel arms usually have an air admixture device. In the case of these extendible swivel arms, it is not possible for a conventional jet regulator to be screwed onto the outlet end, since the backpressure could lead to automatic extension of the extendible swivel arm and to leakages. In the case of such telescopic swivel arms, the jet regulator is therefore fastened to the assembly-side arm portion, with the required intake of air then taking place there. However, such extendible swivel arms are frequently mounted in such a way that the swivel pipe lies over the faucet, in order to compensate for an insufficient height of the faucet over the drainage basin. In the case of the extending swivel arm previously known from DE 1 220 345 A, therefore, leakage is counteracted by the specific arrangement of the air antry openings at the outlet end or close to the outlet end, where this swivel arm previously known from DE 1 220 345 A presupposes that the water outlet is always arranged underneath the air entry opening, in order to prevent the water which remains in the water outlet from running out through the air entry openings when the faucet is closed.

In addition, DE 10 2006 021 801 A1 also discloses an outlet unit, in the case of which an aeration device is arranged over the course of the outlet fitting in such a manner that an opening, which may be undesirable with respect to the visual design of the fitting, is provided in the fitting for external aeration. In addition, problems in relation to leaktightness may occur with the fittings in question on diaphragms and valves, in particular if, for example, a valve does not close completely against the hydrostatic pressure of the water from the return.

U.S. 2007/0252022 A1 has already previously disclosed a sprayhead which is connected to a pull-out kitchen fitting via a flexible hose line. The previously known sprayhead has a valve part 20, which is in the form of a two-way valve and on which the user can select and set either an aerated water jet or else an annular spray jet with the aid of an actuator 120. Whereas the aerated jet is generated by a central, outlet-side jet aerator 70 which serves as an aeration device, the spray jet guided over another liquid path in the valve part is formed by an outlet-side spray outlet 40 which bounds the jet regulator 70 and has through-flow holes 42. In this case, the two-way valve which serves as the valve part 20 is arranged upstream of the jet aerator 70 on the one hand and of the spray outlet 40 on the other hand in the direction of flow, with the jet aerator 70 and the spray outlet 40 forming one and the other water outlet of the previously known outlet unit. The jet aerator 70 and the spray outlet 40 which surrounds it specify the outer contour of the previously known outlet unit in the region of the water outlet thereof and can be realized expediently only as a sprayhead.

SUMMARY

The object is therefore that of providing a sanitary outlet unit which ensures reliable aeration of the water jet combined with a high leaktightness against returning water and can be integrated without relatively major structural changes in existing fittings.

This object is achieved according to the invention in that the aeration device is received in the at least one valve part, in that the aeration device has an aeration channel, which is received in the at least one valve part in such a manner that the aeration channel runs between an intake opening which is contacted by the ambient air and a discharge opening which issues out upstream of an outlet of the valve part on the inflow side, in that the aeration device is provided with at least one actuator, the movement of which between at least one closed position and at least one open position alters the admission of ambient air to the water jet inside the valve part, and in that the actuator, in the closed position thereof, overlaps and seals off the intake opening of the aeration device.

In the case of the outlet unit according to the invention, the aeration function of the aeration device is therefore already integrated in the valve part. To this end, the aeration device has an aeration channel, which is received in the at least one valve part in such a manner that the aeration channel runs between an intake opening which is contacted by the ambient air and a discharge opening which issues out upstream of an outlet of the valve part on the inflow side. Since air is admitted to the through-flowing water in the valve part and therefore at a point located at a large distance upstream, the design of the water outlet is not subject to any restrictions. The aeration device is provided with at least one actuator, the movement of which between at least one closed position and at least one open position alters the admission of ambient air to the water jet inside the valve part, wherein the actuator, in the closed position thereof, overlaps and seals off the intake opening of the aeration device. Since the admission of ambient air to the water jet inside the valve part can be changed by means of the actuator, and since the actuator, in the closed position thereof, overlaps and seals off the intake opening of the aeration device inside the valve part, the sealing means which are present anyway in the valve part can also be utilized for sealing off the aeration device against returning water.

Since the aeration device is formed substantially by an aeration channel which runs between an intake opening which is contacted by the ambient air and a discharge opening which issues out upstream of the outlet of the valve part on the inflow side, the aeration channel projects through a region of the valve part between the two openings thereof, such that the intake opening thereof is arranged at least in the open position in such a way that the fitting body does not prevent the intake of ambient air.

In one embodiment of the outlet unit according to the invention, the valve part is preferably in the form of a cartridge which is arranged in the outlet fitting, regulates the inflow of water from one or more water lines in the direction of the water outlet and performs a sealing function when the cartridge is in the closed position in any case with respect to the outlet opening of the relevant line or lines. The cartridge can be both a cartridge of a mixing faucet and also a cartridge of a simple outlet upper part, which has merely a line as an inlet and in the case of which possible mixing of streams of water takes place in a mixing space located downstream, as seen from the cartridges used.

A readily regulatable inflow from one or more feed lines of the outlet fitting is achieved in a development of the outlet unit in which the valve part has at least two valve elements which are movable with respect to one another, in particular a stationary valve element and a valve element which is movable in relation to said stationary valve element, and at least one of the valve elements can move between a closed position and an open position.

In a preferred embodiment of the outlet part, the valve elements can be formed, for example, as disk-like shaped parts, which come to lie on one another with circular or oval faces, as sealing elements, which provide a sealing function already by virtue of the selection of the material thereof, which can consist for example in a ceramic, a plastic or a mixed form of these materials, and the relevant arrangement. In addition, desired quantitative mixing can be achieved by the movement of the valve elements with respect to one another together with an adapted geometry of the entry openings from a plurality of water lines.

In a preferred embodiment of the outlet unit, the position of the valve elements in relation to one another regulates the entry of water from more than one water line to a common mixing space, which lines in particular transport water at differing temperature. In this case, desired quantitative mixing can be achieved by the movement of the valve elements with respect to one another together with an adapted geometry of the entry openings from a plurality of water lines.

It is possible to particularly easily produce and to effectively control the aeration in an embodiment of the outlet unit according to the invention which provides the intake opening of the aeration device so that it can be closed and sealed off by a sealing element which interacts with the movable valve element, such that for instance the transfer of the actuator from a closed position into the open position at the same time brings the sealing element into an open position with respect to the intake opening.

In a particularly preferred embodiment of the outlet unit, a portion of the movable valve element of the valve part then forms the actuator assigned to the aeration device, which, in the closed position thereof, overlaps and seals off the intake opening of the aeration device, such that the aeration opening is automatically released by the actuator when the inlet from the water lines is opened.

An embodiment of the outlet unit which can be operated reliably and easily represents a single-lever mixing faucet, in the case of which a lever of the outlet unit is connected to the movable valve element via a final control element, and actuation of the lever triggers a movement of the valve element which runs substantially transversely thereto, such that the valve elements can execute a movement parallel to one another.

In order to obtain either an aerated or an unaerated water jet from the outlet unit according to the invention, it is advantageous if at least one further, second actuator, which is independent of the first actuator, is provided on the aeration device for changing the entry of air. In the case of a mixing faucet for mixing water of differing temperature, this function could be used, for example, for identifying temperature ranges, where one temperature range can be identified by a laminar jet and another can be identified by an aerated jet.

In order to achieve particularly effective mixing of the water jet with air in the case of the outlet unit according to the invention, one embodiment can include the provision of a mixing device on the valve part upstream in the region of the discharge opening of the aeration device.

In order to already split the jet by means of the mixing device or to admit air by means of the flowing water jet and then to carry it along with simultaneous mixing, in an advantageous embodiment the mixing device, as a jet splitter, nozzle or similar cross section constriction, can form a component part of the valve part, and the device in question can then therefore already be provided as a component part of a cartridge and, in the case of a cross section constriction, generates a negative pressure by virtue of the acceleration of the water jet on the outflow side thereof.

Another expedient embodiment in this context is the formation of the mixing device as a separate insertion part which can be introduced exchangeably into a region of the valve part, in particular configured as a jet regulator which allows for a demand-oriented selection and form of the jet which emerges from the outlet.

An advantageous embodiment of the outlet unit can be provided in such a manner that the aeration device is provided with a retaining means which, when the aeration device is in the open position and the water is obstructed from running out, prevents the water from flowing back through the latter.

In an expedient development, the retaining means can then be provided as a non-return valve.

By virtue of the arrangement of the aeration device and also optionally of a mixing device upstream of the water outlet, the outlet of the outlet fitting can be freely designed within broad limits. Nevertheless, an expedient development of the outlet unit can consist in providing a receptacle for the arrangement of a jet regulator, jet director or similar jet former on the water outlet.

BRIEF DESCRIPTION OF THE DRAWINGS

The invention is explained in more detail hereinbelow on the basis of exemplary embodiments in the drawing. In this respect, in partially diagrammatic form, FIG. 1 shows a sectioned side view of a first exemplary embodiment of an outlet unit comprising an outlet fitting with a water outlet and comprising an aeration device which is received in a valve part and also comprising an actuator which is in a closed position;

FIG. 2 shows a sectional view from above of the outlet unit shown in FIG. 1 along the section line II-II;

FIG. 3 shows a sectioned side view of the outlet unit shown in FIG. 1 with an actuator in an open position;

FIG. 4 shows a sectional view from above of the outlet unit shown in FIG. 3 along the section line IV-IV;

FIG. 5 shows a perspective, longitudinally sectioned view of the valve part of the outlet unit obliquely from below in the closed position shown in FIGS. 1 and 3;

FIG. 6 shows a perspective, longitudinally sectioned view of the valve part of the outlet unit obliquely from below in the open position shown in FIGS. 2 and 4;

FIG. 9 shows a perspective, longitudinally sectioned side view of the valve part shown in FIG. 7; and FIG. 10 shows a perspective, longitudinally sectioned side view of the valve part shown in FIG. 8.

DETAILED DESCRIPTION OF THE PREFERRED EMBODIMENTS

Figure 7:
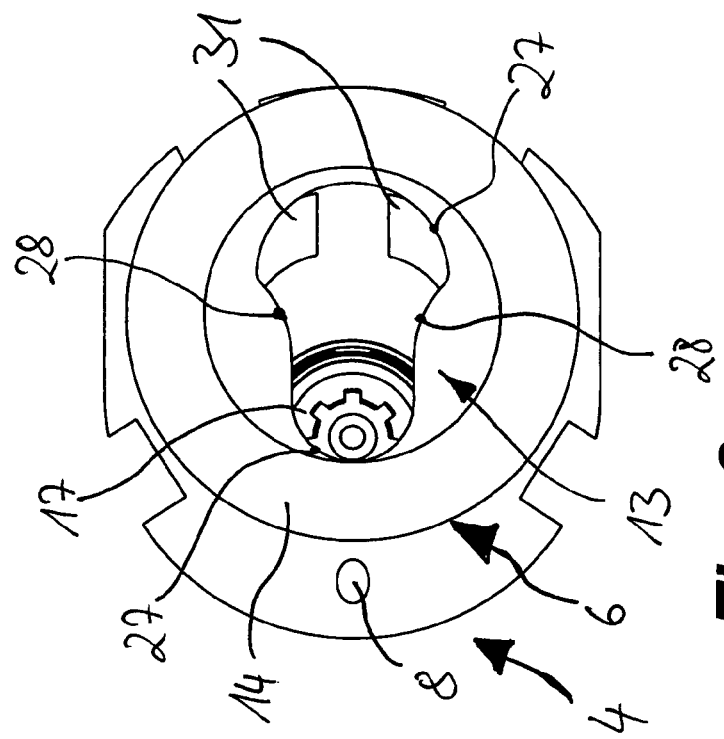
FIG. 7 shows a plan view from above of a second exemplary embodiment of valve elements, in a closed position, of a valve part comprising a jet regulator as a mixing device arranged on the outflow side.

FIGS. 1 to 4 firstly show a sanitary outlet unit, denoted as a whole by 1, comprising an outlet fitting 2 having a water outlet 3, which is not shown in FIGS. 2 and 4 on account of the sectional depictions II-II and IV-IV. As can be seen in FIGS. 1 and 3, an inflow of water can be admitted to a valve part 5 via the water lines 7, the discharge of which water from the water outlet can be regulated by the valve part 5. To aerate the water jet, an aeration device 4 located upstream of a water discharge of the water outlet 3 at a distance therefrom in the direction of flow is arranged on the outlet unit 1.

As can be seen in FIGS. 1 and 3, the aeration device 4 of the outlet unit 1 is received in the valve part 5 and is provided with an actuator 6, the movement of which between an open position and a closed position alters the admission of ambient air to the water jet inside the valve part 5. In this respect, the aeration device 4 has an aeration channel 10, which extends between an intake opening which is contacted by the ambient air and a discharge opening 9 which issues out upstream of the outlet 20 of the valve part 5 on the inflow side. It can be seen that, in the exemplary embodiment, the valve part 5 is in the form of a cartridge of a single-lever mixing faucet and has a stationary and a movable valve element 11, 12, which are movable with respect to one another in such a manner that the movable valve element 12 can be moved from a closed position (FIG. 1) into an open position (FIG. 3), and vice versa. To this end, the lever 15 is actuated by a substantially upwardly directed pulling movement, as a result of which the final control element 16 connected to the lever moves or drives a slide plate 19 and, connected thereto, the valve element 12 substantially perpendicularly with respect to the pulling movement. As a result of the transfer of the valve element 12 into the open position shown in FIGS. 3 and 4, the portion 14 of the valve element 12 releases the intake opening 8 of the aeration device 4, such that air for aerating the water jet can be admitted to the interior of the valve part 5 via said opening 8. In the case of the present outlet unit 1, the actuator 6 is formed by the valve element 12 with the portion 14 thereof and also the connection thereof to the slide plate 19. In this case, the aeration channel 10 runs from an upwardly facing surface of the disk-like valve element 11 obliquely through the latter in the direction toward an outlet 20 of the valve part 5, upstream of which the discharge opening 9 of said channel issues out on the inflow side at the downwardly facing surface of the valve element 11. As can be gathered from FIGS. 1 to 6, a mixing device 17 in the form of a cross section change for accelerating the water jet and generating a negative pressure is arranged upstream of the outlet 20 in the fixed valve element 11. A receptacle 18 is arranged at the free end of the water outlet for the optional arrangement of a jet former.

An inspection of FIG. 2 and of FIG. 4 further reveals that, in the case of the opening movement of the lever 15 mentioned, the associated movement of the valve element 12 firstly enables the inflow of water from the two water lines 7 into the mixing space 13 of the valve part 5, and secondly this movement releases the intake opening 8 for admitting ambient air for aerating the water jet within the valve part 5 by virtue of the movement of the portion 14 of the valve element 12. The fixed valve element 11 is a disk-shaped plate which has a substantially round cross section and is received by a substantially cylindrical receiving space 21 of the outlet fitting 2. With a smaller diameter than the valve element 11, the movable valve element 12 is also formed with a substantially circular circumference, but has approximately the shape of a ring in cross section, with the mixing space 13 of the valve part 5 being formed by the ring opening of the valve element 12 together with the slide plate 19 which terminates the latter upward. The opening edge of the movable valve element 12 which faces toward the fixed valve element 11 in this case has a cross section which is constricted compared to the opening edge which faces toward the lever 15, such that the openings which are to be overlapped by the first opening edge mentioned in the closed position (cf. FIGS. 1, 3, 5 and 7) are well covered by the edge.

As was already evident indirectly from the preceding Figures, FIGS. 1 to 4, in the illustration shown in FIGS. 5 and 6, which in turn show the closed position (FIG. 5) and the open position (FIG. 6) of the outlet unit, it becomes even clearer that the valve part 5 which is in the form of a cartridge has influxes 30 of water which are admitted from below via two water lines 7. These are two influxes 30 of water of differing temperature in the two lines 7, which is mixed in the mixing space 13 to the outlet temperature thereof. In actual fact, with the selected cartridge form, the water admitted is discharged by a similarly downwardly pointing outlet 20 of the water jet in the direction toward the water outlet, with the water jet leaving the valve part 5 via a radial passage portion which is shown in FIGS. 1 and 3 and is arranged on the outflow side of the outlet 20. In the closed position shown in FIG. 5, edge regions of the valve element 12 which run parallel to the valve element 11 overlap both the water inflow openings 31 to the mixing space 13 and also the intake opening 8 of the aeration device 4. By virtue of the movement of the movable valve element 12 from the closed position into the open position shown in FIG. 6, these openings 31, 8 are released for the entry of water into the mixing space 13 and air into the aeration channel 10 of the valve part 5. In this case, the valve element 12 moves substantially parallel to the fixed valve element 11 and to edge regions of a flange-like shoulder 26 of the valve part 5, which tapers the cross section of the latter upward like a shoulder. Through an opening 22 in the tapered cylinder cross section 23, the final control element 16 (not shown) engages by way of a ball joint 24 (likewise not shown) arranged at the end thereof into a receptacle 25 arranged on the flat side of the slide plate 19 facing away from the mixing space 13, as a result of which the movable valve element 12 can be moved by intervention of the slide plate 19 by virtue of a movement of the lever 15. As has already been mentioned once, in FIGS. 1 to 6 the water emerges from the mixing space 13 through a mixing device 17 in the form of a cross section constriction, before it passes into the outlet 20. The cross section constriction accelerates the water, such that air is admitted through the channel 10 and is then mixed with the water by virtue of the negative pressure which arises.

Figure 8:
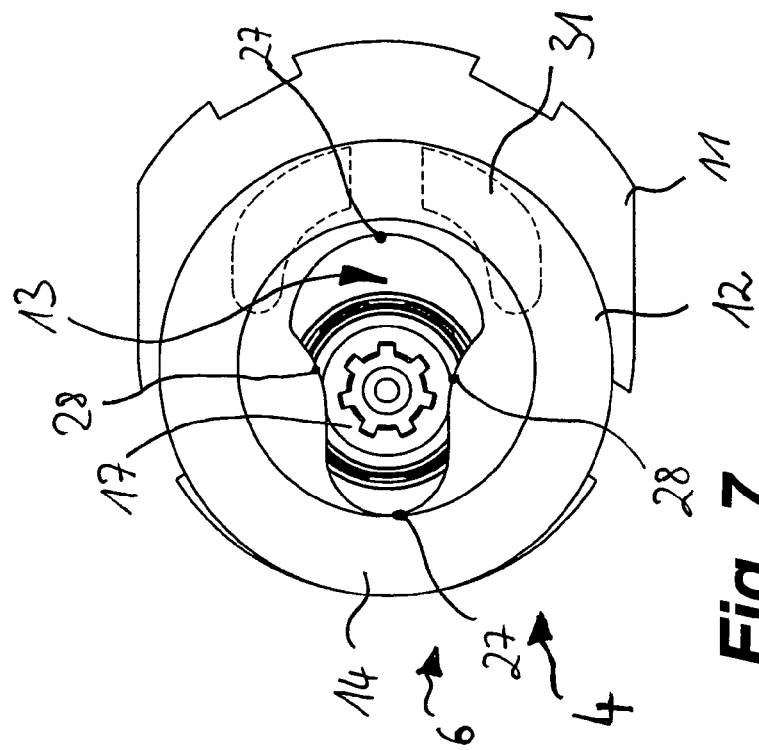
FIG. 8 shows a plan view from above of the valve elements of the valve part shown in FIG. 7 in an open position.

The exemplary embodiment shown in FIGS. 7 and 8 has, in the direction toward the outlet 20 (not shown) on the outflow side as seen from the mixing space 13, a mixing device 17, which is in the form of a jet regulator and the side of which is not visible and faces away from the observer issues out into the outlet 20 together with the discharge opening 9 (which is likewise not shown) of the aeration device 4, of which only the intake opening 8 can be seen in FIG. 8. It can likewise be gathered from FIGS. 7 and 8, but also from FIGS. 9 and 10, that the opening edge of the movable valve element 12 which faces toward the observer indeed forms an annular opening, whereas the cross section constriction located at the opposing opening edge which faces toward the fixed valve element covers the water entry openings. The cross section constriction of the opening edge in question is in this case formed by two approximately semicircular, convexly curved edge regions 27, which form the planar opening margins lying in the direction of movement and which are connected by two concave edge regions 28 arranged therebetween.

FIGS. 9 and 10 show more clearly than FIGS. 7 and 8 that the mixing device is formed in this exemplary embodiment as a jet regulator having a honeycombed grid 29 which promotes the mixing, and that water passing through the mixing device 17 can be aerated by the aeration channel 10, which is released in the open position (FIG. 10), of the aeration device 4 in the valve part 5 of the sanitary outlet unit.

The above-described invention accordingly relates to a sanitary outlet unit 1 comprising an outlet fitting 2 which has at least one water outlet 3 and comprising at least one aeration device 4 which is provided for aerating the water jet and is arranged upstream of the at least one water outlet 3 at a distance therefrom in the direction of flow, and comprising at least one valve part 5 which regulates the inflow from at least one water line 7 to the water outlet 3. In order to provide a sanitary outlet unit 1 which ensures reliable aeration of the water jet combined with a high leaktightness against returning water and can be integrated without relatively major structural changes in existing fittings, the aeration device 4 is received in the at least one valve part 5, and the aeration device 4 is provided with at least one actuator 6, the movement of which between at least one closed position and at least one open position alters the admission of ambient air to the water jet inside the valve part 5. With the greatest possible design freedom for redevelopments of the fitting form, the outlet unit 1 according to the invention also makes it possible, however, to draw on designs which already exist in large numbers, without these having to be subject to design changes.

The invention claimed is:

1. A sanitary outlet unit, comprising; an outlet fitting (2) which has at least one water outlet, at least one aeration device (4) which is provided for aerating a water jet and is arranged upstream of the at least one water outlet at a distance therefrom in a direction of flow, a valve part (5) with a fixed valve element (11) and a movable valve element (12) which regulates an inflow from at least one water line to the water outlet, the aeration device (4) is received in the valve part (5), the aeration device (4) has an aeration channel (10), which is located in the valve part (5) in such a manner that the aeration channel (10) runs between an intake opening (8) which is contacted by the ambient air and a discharge opening (9) which issues out upstream of a water jet outlet (20) of the valve part (5) on the inflow side, at least one actuator (6) which moves the movable valve element (12) between at least one closed position and at least one open position to alter the admission of ambient air to the water jet inside the valve part (5), the movable valve element (12), in the closed position thereof, overlaps and seals off the intake opening (8) of the aeration device (4), and movement of the movable valve element (12) by the at least one actuator also controls an on and off function for the flow of water from the at least one water line to the water outlet.

2. The outlet unit as claimed in claim 1, wherein the valve part (5) is formed as a cartridge arranged in the outlet fitting (2).

3. The outlet unit as claimed in claim 1, wherein the valve elements (11, 12) are provided as disk-shaped sealing elements.

4. The outlet unit as claimed in claim 1, wherein a position of the valve elements (11, 12) in relation to one another regulates entry of water from more than one of the water lines (7) to a common mixing space (13), said water lines (7) transport water at differing temperature.

5. The outlet unit as claimed in claim 1, wherein the intake opening (8) of the aeration device (4) can be closed and sealed off by a sealing element which interacts with the movable valve element (12).

6. The outlet unit as claimed in claim 1, wherein a portion (14) of the movable valve element (12) of the valve part (5) forms a part of the actuator (6) assigned to the aeration device (4).

7. The outlet unit as claimed in claim 6, wherein a lever (15) of the outlet unit (1) is connected to the movable valve element (12) via a final control element (16), and actuation of the lever (15) triggers a movement of the movable valve element (12) which runs substantially transversely in relation to the actuation direction.

8. The outlet unit as claimed in claim 7, wherein at least one further, second actuator, which is independent of the first actuator (6), is provided on the aeration device (4) for changing the admission of air.

9. The outlet unit as claimed in claim 1, wherein a mixing device (17) is provided on the valve part (5) upstream in a region of the discharge opening (9) of the aeration device (4).

10. The outlet unit as claimed in claim 9, wherein the mixing device (17) is formed as a jet splitter, nozzle or a cross section constriction, and forms a component part of the valve part (5).

11. The outlet unit as claimed in claim 9, wherein the mixing device (17) is provided as a separate insertion part which is introduced into a region of the valve part (5).

12. The outlet unit as claimed in claim 1, wherein the aeration device (4) is provided with a retaining element which, when the aeration device (4) is in the open position, prevents water from flowing back through the aerator device.

13. The outlet unit as claimed in claim 12, wherein the retaining element comprises a non-return valve.

14. The outlet unit as claimed in claim 1, wherein a receptacle (18) for the arrangement of a jet regulator, jet director or jet former is provided on the water outlet (3).

15. The outlet unit as claimed in claim 1, wherein the valve elements (11, 12) are formed from a ceramic material or a plastic material.

16. The outlet unit as claimed in claim 11, wherein the mixing device comprises a jet regulator.

17. The outlet unit as claimed in claim 1, wherein the movable valve element (12) is movable from a position that stops the inflow from the water line to a position that enables the inflow from the water line into a common mixing space (13), and is also movable to a position to open the intake opening (10) of the aeration channel (10).

18. The outlet unit as claimed in claim 1, wherein the valve elements (11, 12) are provided as disk-shaped sealing elements, the aeration channel (10) extends through a thickness of one of the valve elements and is closed by a sliding movement of the movable valve element (12) on the fixed valve element (11) blocking the intake opening (8).

19. A valve (5) comprising: a fixed valve element (11) and a movable valve element (12), the fixed and movable valve elements being formed as disk-shaped elements in sliding contact with one another; at least one actuator (6) which moves the movable valve element (12) between at least one open and a closed position, wherein in the closed position, the movable valve element overlaps and seals off an intake opening (8) of an aeration channel (10) that extends through a thickness of one of the valve elements and seals off at least one water inlet opening that extends through a thickness of one of the valve elements, and movement of the movable valve element (12) by the at least one actuator to the at least one open position opens the aeration channel intake opening, opens the at least one water inlet opening, or opens both the aeration channel intake opening and the at least one water inlet opening to control an on and off function for both aeration and a flow of water through the valve.

* * * * *